United States Patent
Rowe

(10) Patent No.: US 10,913,413 B2
(45) Date of Patent: Feb. 9, 2021

(54) WEARABLE ARTICLE DETECTION AND CLIMATE ADJUSTMENT SYSTEM FOR A VEHICLE INTERIOR

(71) Applicant: Toyota Motor Engineering & Manufacturing North America, Inc., Plano, TX (US)

(72) Inventor: Michael Paul Rowe, Pinckney, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 148 days.

(21) Appl. No.: 16/209,113

(22) Filed: Dec. 4, 2018

(65) Prior Publication Data
US 2020/0172034 A1 Jun. 4, 2020

(51) Int. Cl.
| | | |
|---|---|---|
| *B60H 1/00* | (2006.01) | |
| *B60R 16/037* | (2006.01) | |
| *B60R 16/023* | (2006.01) | |
| *H04W 4/38* | (2018.01) | |

(52) U.S. Cl.
CPC ....... *B60R 16/037* (2013.01); *B60H 1/00657* (2013.01); *B60H 1/00742* (2013.01); *B60H 1/00807* (2013.01); *B60H 1/00892* (2013.01); *B60R 16/0237* (2013.01); *H04W 4/38* (2018.02)

(58) Field of Classification Search
CPC ........................ B60H 1/00742; G05D 23/1932
See application file for complete search history.

(56) References Cited

U.S. PATENT DOCUMENTS

| | | |
|---|---|---|
| 9,505,365 B1 | 11/2016 | Van Wiemeersch |
| 9,641,620 B2 | 5/2017 | Sweeney et al. |
| 2013/0072114 A1 | 3/2013 | Abhyanker |
| 2013/0232996 A1* | 9/2013 | Goenka .................... B60N 2/56 62/3.61 |
| 2014/0039691 A1* | 2/2014 | Gupta ................ G05D 23/1932 700/278 |
| 2015/0025738 A1 | 1/2015 | Tumas et al. |
| 2015/0145671 A1 | 5/2015 | Cohen et al. |
| 2017/0129335 A1 | 5/2017 | Lu et al. |
| 2017/0151956 A1* | 6/2017 | Boesen .............. G01C 21/3617 |
| 2017/0349027 A1* | 12/2017 | Goldman-Shenhar ....................... B60H 1/0075 |

OTHER PUBLICATIONS

"Interactive clothes based on IOT using NFC and Mobile Application," 2017 IEEE 7th Annual Computing and Communication Workshop and Conference (CCWC), Las Vegas, NV, 2017, pp. 1-4 to Reddy et al. (Year: 2017).*

* cited by examiner

*Primary Examiner* — Kenneth J Malkowski
(74) *Attorney, Agent, or Firm* — Christopher G. Darrow; Darrow Mustafa PC

(57) ABSTRACT

System, methods, and other embodiments described herein relate to automatically adjusting a climate of a vehicle based on detecting the type of clothing a vehicle occupant is wearing. In one embodiment, the method includes, in response to acquiring an identifier from a reader, where the identifier being associated with a tag affixed to a wearable article in proximity of the reader, determining a type of the wearable article based on the identifier. The method includes controlling a climate control system based at least in part on the type of the wearable article.

14 Claims, 7 Drawing Sheets

WEARABLE ARTICLE DETECTION AND CLIMATE ADJUSTMENT SYSTEM FOR A VEHICLE INTERIOR

TECHNICAL FIELD

The subject matter described herein relates generally to vehicle climate control and, more particularly, to automatic vehicle climate control systems that factor in the type of clothing worn by the occupant to provide thermal comfort.

BACKGROUND

Vehicles with an automatic climate control system can utilize user input along with input from various interior and exterior environmental sensors indicating interior and exterior ambient temperatures, humidity, solar load, etc., to determine an appropriate thermal comfort level for occupants of a passenger compartment. A climate control system, for example, may determine the discharge air temperature, air flow delivery method and fan speed to meet and maintain the desired comfort level. However, clothing worn by the occupants can affect the thermal comfort level significantly. For example, an occupant wearing a winter coat upon entering the vehicle may want the interior ambient temperature of the vehicle to be somewhat lower than without the coat. Alternatively, for example, an occupant wearing a dress jacket in the summer may want the interior to be at a slightly cooler temperature than without the jacket.

SUMMARY

Example systems and methods are disclosed herein that relate to a manner of automatically adjusting the climate of a vehicle based on detecting the type of clothing a vehicle occupant is wearing. In one embodiment, a climate system is disclosed. The climate system includes a reader, one or more processors in communication with the reader and a memory that is communicably coupled to the one or more processors. The memory stores a detection module including instructions that when executed by the one or more processors cause the one or more processors to, in response to acquiring an identifier from the reader, determine a type of a wearable article based on the identifier. The identifier is associated with a tag affixed to the wearable article in proximity of the reader. The memory also stores a climate control module including instructions that when executed by the one or more processors cause the one or more processors to control a climate control system based at least in part on the type of the wearable article.

In one embodiment, a non-transitory computer-readable medium is disclosed. The non-transitory computer-readable medium stores instructions that when executed by one or more processors cause the one or more processor to perform the disclosed functions. The instructions include instructions to, in response to acquiring an identifier from a reader, determine a type of a wearable article based on the identifier. The identifier is associated with a tag affixed to the wearable article in proximity of the reader. The instructions include instructions to control a climate control system based at least in part on the type of the wearable article.

In one embodiment, a method is disclosed. The method includes, in response to acquiring an identifier from a reader, determining a type of a wearable article based on the identifier. The identifier is associated with a tag affixed to the wearable article in proximity of the reader. The method includes controlling a climate control system based at least in part on the type of the wearable article.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments associated with adjusting a climate of a vehicle interior by detecting a type of clothing an occupant is wearing are discussed herein. As mentioned previously, the type of clothing worn by occupants within a vehicle can affect the thermal comfort level significantly. For example, when a driver enters the vehicle from a cold exterior environment, the vehicle interior temperature is, in some cases, manually set to a desired temperature. The driver may not consider the winter coat that is being worn when setting the temperature. Depending on the difference between the vehicle exterior and interior temperatures, the driver may have to adjust, on more than one occasion, the temperature setting to achieve a comfortable body temperature. Furthermore, a similar situation can occur when the driver enters the vehicle from a warm exterior environment wearing light-weight clothing. In other words, to reach a desired thermal comfort level, the temperature adjustment of the vehicle interior can depend on the type of clothing worn.

Accordingly, in one embodiment, a climate system receives information from an identifier that is associated with a wearable article to determine a type of wearable article, e.g., winter coat, short-sleeve shirt, shorts, bathing suit, etc., and appropriately adjusts the climate of the vehicle interior depending on the type of wearable article. For example, in one embodiment, as the driver enters the vehicle wearing a winter coat affixed with a tag containing the identifier, a reader acquires the identifier. At this point, the climate system determines the type of winter coat the driver is wearing, e.g., heavily insulted, downed, light jacket, etc., and adjusts the climate based at least in part on the type of winter coat.

Additionally, or alternatively, in one embodiment, the climate system adjusts the climate of the vehicle interior only if the wearable article is near the occupant. That is, the climate system determines that the driver is separated from the wearable article, e.g., the coat is placed in the back seat upon entering the vehicle, and does not interact with the climate control system, i.e., the climate control system remains at its current setting. In one embodiment, the climate system determines that there is more than one wearable article within the vehicle, for example, one vehicle occupant may be wearing a heavy coat and jeans while another vehicle occupant may be wearing a lightweight shirt and a pair of shorts. Accordingly, the climate system automatically adjusts the interior of the vehicle to accommodate each of the vehicle occupants.

Figure 1:
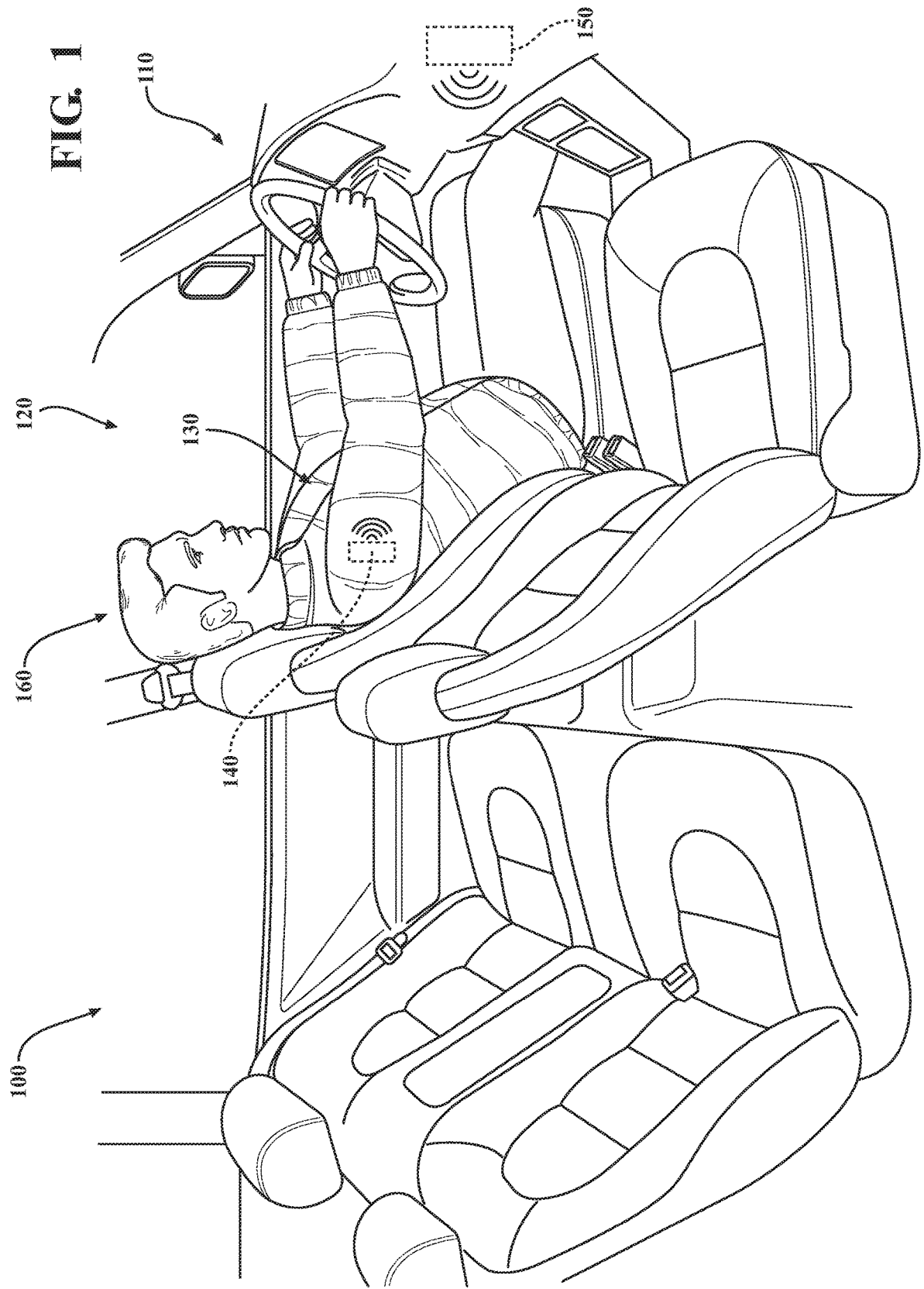
FIG. 1 is a perspective view of a portion of a vehicle interior that includes an example climate system utilizing a reader for communicating with a tag affixed to a wearable article.

With reference to FIG. 1, one embodiment of the vehicle 100 is illustrated that includes an example of a climate system 110 that is implemented to perform methods and other functions as disclosed herein relating to adjusting a climate of a vehicle interior 120 depending on a type of wearable article that is being worn. The vehicle interior 120, as used herein, is an enclosed interior portion, e.g., a passenger cabin, of the vehicle 100 that typically accommodates occupants. The climate system 110 includes at least one wearable article 130, a tag 140 affixed to the wearable article 130 and a reader 150 located in the vehicle 100 that can discreetly "read" the tag 140 and extract information about the wearable article 130 from unique identifiers associated with the tag 140. The climate system 110 leverages these unique identifiers to determine the type of wearable article that may be worn by a vehicle occupant 160. By reading the tag 140 with the reader 150 and determining the type of clothing that is being worn in the vehicle 100 from the identifier, the climate within the vehicle 100 may be controlled and adjusted automatically by the climate system 110.

The wearable article 130 is an article of clothing that can be worn by the vehicle occupant 160. For example, wearable articles 130 can include, but are not limited to coats, e.g., winter, ski, light, heavy, etc., hats, e.g., winter, baseball caps, beanie, beret, etc., shirts, e.g., long sleeve, sweat, short sleeve, etc., pants, shorts, shoes, socks, swimsuits, and the like. For example, the wearable article 130 in FIG. 1 is a light winter coat. The wearable article 130 may be configured such that the tag 140 is affixed to the wearable article 130. The tag 140 may be affixed to the wearable article 130 by any suitable method, e.g., sewn between two portions of the wearable article 130, adhered to the wearable article 130, tied to the wearable article 130 by, e.g., zip ties, cable ties, etc., fastened to the wearable article 130, etc.

The tag 140 is preferably a small electronic device that can be affixed to the wearable article 130. The tag 140 may include an integrated circuit (IC) having at least a processor, a memory and a transceiver, and an antenna (not shown) configured for radio frequency (RF) communication with the reader 150 when the tag 140 is in proximity of the reader 150. The tag 140 may be a passive tag. That is, the tag 140 receives its power by inductive coupling from a magnetic field generated by the reader 150. The tag 140 may be an active tag, which contains a power source, e.g., a battery, that enables the tag 140 to communicate with the reader 150 without the use of inductive coupling for supplying power. The tag 140 and the reader 150 can communicate with each other, i.e., the tag 140 can be "read" by the reader 150, when the tag 140 is in proximity of the reader 150. The tag 140 may be in proximity of the reader 150 when the tag 140 is, e.g., less than a centimeter from the reader 150, or several meters from the reader 150. In one embodiment, the antenna of the tag 140 is a dedicated near field communication (NFC) antenna configured for NFC protocol communication. In another embodiment, the antenna of the tag 140 is a dedicated radio-frequency identification (RFID) antenna configured for RFID protocol communication.

The tag 140 includes the identifier. In one embodiment, the identifier is digital data stored in the memory of the IC. The identifier is associated with the tag 140 that is affixed to the wearable article 130 and may be, for example, a digital description representing the type of the wearable article 130, a serial number that can be cross-referenced against known types of wearable articles stored in a lookup table 340 as set forth below and illustrated in FIG. 3, and/or a digital address, e.g., a uniform resource locater (URL), where the type of the wearable article 130 can be determined, e.g., a website, a remote database, etc., containing the type of the wearable article 130.

The reader 150, as shown in FIG. 1, is illustrative of a single embodiment; this arrangement shows the reader 150 in hidden lines located within an instrument panel of the vehicle 100. However, it is not necessary for the reader 150 to be located within the instrument panel. For example, the reader 150 may be located in any suitable location within the vehicle 100. The reader 150 may be a small computing device equipped with a processor, memory, and communication hardware, such as an antenna, transceiver, and the like, that is capable of communicating with the wearable article 130, i.e., the tag 140 affixed to the wearable article 130, via short-range communication protocol and/or frequency. For example, readers 150 can include, but are not limited to near-field communication (NFC) readers, radio-frequency identification (RFID) readers, and the like. The reader 150 can communicate with the tag 140 affixed to the wearable article 130 via a number of different short-range communication protocols and/or frequencies, such as NFC, RFID, etc. The reader 150 is capable of transmitting a signal to the tag 140 and receiving a signal from the tag 140. There may be one or more readers 150, and there may be one or more antennas associated with a reader 150, as illustrated and described in more detail below. The reader 150 may be a standalone device, the reader 150 may be integrated with other components of the climate system 110, or integrated with any other device of the vehicle 100.

Figure 2:
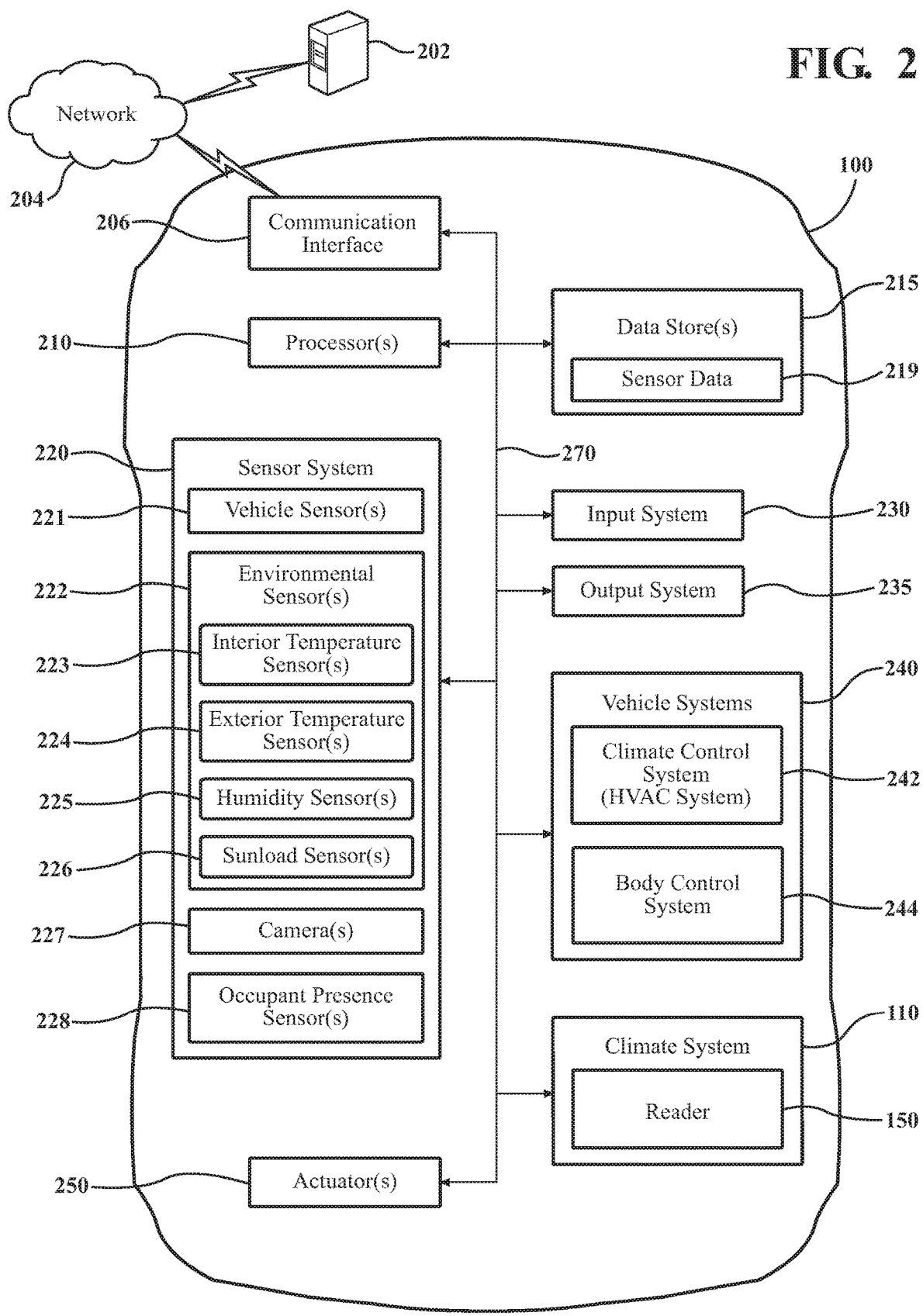
FIG. 2 illustrates one embodiment of a vehicle within which systems and methods disclosed herein may be implemented.

Alternatively or additionally, the reader 150, in one embodiment, may be a camera 227 of a sensor system 220 (as illustrated in FIG. 2). For example, the camera 227, i.e., the reader 150, may be a rear facing dash camera of the vehicle 100. In this instance, the tag 140 may be, e.g., a quick response code (QR Code), a bar code, etc., printed on the wearable article 130. The identifier may be a digital description, a serial number or a digital address contained in the QR Code. In one embodiment, the climate system 110 may decode the image and extract the identifier.

Referring to FIG. 2, an example of the vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, benefits from the systems and methods as discussed herein.

The vehicle 100 also includes various elements. It will be understood that in various embodiments it may not be necessary for the vehicle 100 to have all the elements shown in FIG. 2. The vehicle 100 can have any combination of the various elements shown in FIG. 2. Further, the vehicle 100 can have additional elements to those shown in FIG. 2. In some arrangements, the vehicle 100 may be implemented without one or more of the elements shown in FIG. 2. Further, while the various elements are shown as being located within the vehicle 100 in FIG. 2, it will be understood that one or more of these elements can be located external to the vehicle 100. Further, the elements shown may be physically separated by large distances.

Some of the possible elements of the vehicle 100 are shown in FIG. 2 and will be described along with subsequent figures. However, a description of many of the elements in FIG. 2 will be provided after the discussion of FIGS. 3-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

It should be appreciated that the climate system 110 may control various vehicle systems 240, namely a climate control system 242 based solely on the type of wearable article as determined from the identifier. The "climate control system 242" as used herein refers to the heating, ventilation and air conditioning (HVAC) system of the vehicle 100 that includes various components, as set forth below. Alternatively, the climate system 110 may control the climate control system 242 based on the type of wearable article and a climate profile that is based on the climate internal and external to the vehicle 100. Furthermore, the climate system 110 may modify the climate control system 242 differently depending on user defined preferences. The noted functions and methods will become more apparent with a further discussion of the figures.

The vehicle 100 may be configured so that the climate system 110, the sensor system 220 and other components of the vehicle 100 can communicate with each other using a controller area network (CAN) bus 270 or the like. Via the CAN bus and/or other wired or wireless mechanisms, the climate system 110 may transmit messages to various devices in the vehicle 100 and/or receive messages from the various devices, e.g., controllers, actuators, sensors, etc. Alternatively, any of the elements and/or systems described herein may be directly connected to each other without the use of a bus. Also, connections between the elements and/or systems described herein may be through another physical medium (such as wired connections), or the connections may be wireless connections.

The climate system 110 may be configured to operate via the communication interface 206 in a networked environment supporting connections to one or more remote computers for wireless communication between the vehicle 100 and a remote server 202. The climate system 110 may function to control processor(s) 210 to transmit data to the remote server 202 via the communication interface 206 to request, for example, information about the type of wearable article. Further, the climate system 110 may receive data from the remote server 202 via the communication interface 206, e.g., the material, insulation, thermal factor, etc. of the wearable article 130.

The remote server 202 is a computer including a processor and a memory, the memory stores instructions which may be executed by the processor. The remote server 202 can communicate, via the network 204 with the vehicle 100, and thus the climate system 110, via the communication interface 206.

The communication interface 206 may be configured to establish and enable continued and uninterrupted interaction between the vehicle 100 and external sensors, other vehicles, other computer systems, various external computing and communications systems and networks (such as a network 204, a satellite system, a cellular phone/wireless communication system), and also remote users or entities, to enable and/or facilitate performance of one or more of the functions described herein. The communication interface 206 may include interfaces enabling communication in a wide area network (WAN), a wireless telecommunications network, and/or any other suitable communications networks (such as or including the network 204, for example).

The network 204 represents one or more mechanisms by which the vehicle 100 and the remote server 202 may communicate with each other. The network 204 may include one or more known networks and/or networking technologies, such as wireless communication networks (e.g., Bluetooth, IEEE 802.11, etc.), a cellular network, local area networks (LAN) and/or wide area networks (WAN), including the Internet, providing data communication services.

Figure 3:
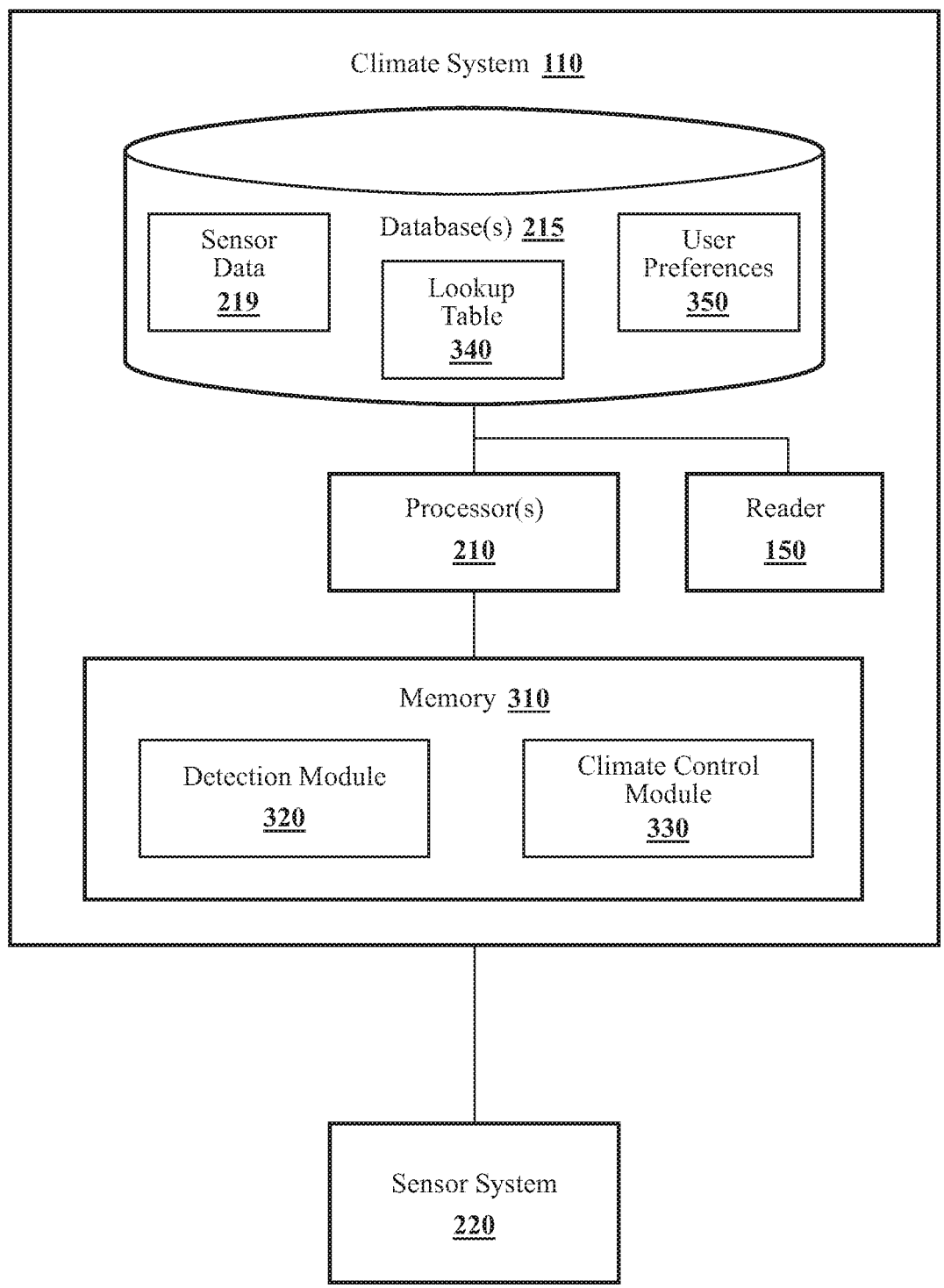
FIG. 3 illustrates one embodiment of a climate system that is associated with using sensor data from the reader to identify the wearable article to automatically adjust a climate control system in the vehicle of FIG. 2.

With reference to FIG. 3, one embodiment of the climate system 110 of FIG. 1 is further illustrated. The climate system 110 is shown as including the processor(s) 210 and the reader 150 from the vehicle 100 of FIG. 2. Accordingly, the processor(s) 210 may be a part of the climate system 110, the climate system 110 may include a separate processor from the processor(s) 210 of the vehicle 100. Further, the climate system 110 and the reader 150 may be configured for communicating with the processor(s) 210 through the CAN bus 270 or via various other wired and/or wireless networking technologies, e.g., cellular, BLUETOOTH, a universal serial bus (USB), Wi-Fi, wired and/or wireless packet networks, etc.

In one embodiment, the climate system 110 includes a memory 310 that stores a detection module 320 and a climate control module 330. The memory 310 is a random-access memory (RAM), read-only memory (ROM), a hard-disk drive, a flash memory, or other suitable memory for storing the detection module 320 and the climate control module 330. The detection module 320 and the climate control module 330 are, for example, computer-readable instructions that when executed by the processor(s) 210, cause the processor(s) 210 to perform the various functions disclosed herein.

The climate system 110 includes database(s) 215. The database(s) 215 is, for example, an electronic data structure stored in the memory 310 or another electronic database that is configured with routines that can be executed by the processor(s) 210 for analyzing stored data, providing store data, organizing stored data, and so on. Thus, in one embodiment, the database(s) 215 store data used/provided by the detection module 320 and the climate control module 330 in executing various functions, as set forth below.

The detection module 320, in one embodiment, includes instructions that function to control the processor(s) 210 to acquire the identifier from the reader 150, which is used to determine the type of wearable article. The detection module 320 may store the identifier in the database(s) 215.

The climate control module 330, in one embodiment, includes instructions that function to control the processor(s) 210 to acquire the vehicle data from, for example, one or more environmental sensor(s) 122 of the sensor system 220, which may be used to control the climate control system 242. In one embodiment, and referring back to FIG. 2, the vehicle data includes data collected from interior temperature sensor(s) 223, exterior temperature sensor(s) 224, humidity sensor(s) 225, sunload sensor(s) 226, camera(s) 227, occupant presence sensor(s) 228, and/or another sensor integrated with the vehicle 100. In further aspects, the climate control module 330 may control multiple ones of the noted sensors that are embedded with the vehicle 100. Moreover, in one embodiment, the vehicle data includes data from multiple sensors of a set such as multiple interior temperature sensors 223, multiple occupant presence sensors 228, etc. The climate control module 330 may collect the vehicle data and store the vehicle data as sensor data 219 in the database(s) 215 as described in greater detail below.

As set forth below, in one or more arrangements, the database(s) 215 include the lookup table 340 and user preferences 350. The lookup table 340, for example, may be accessed by the detection module 320 and may include various types of wearable articles that are indexed such that the type of wearable articles can be associated to a specific identifier read from the reader 150. The user preferences 350 may be accessed by the climate control module 330 to determine if the vehicle occupant 160, for example, has stored user preferences 350 that adjust to the climate of the vehicle interior 120 when a specific type of wearable article is worn. Additionally, while the sensor data 219, the lookup table 340, and the user preferences 350 are illustrated as being stored within the database(s) 215, it should be understood that in various embodiments the sensor data 219, the lookup table 340, and/or the user preferences 350 can be stored in the memory 310, integrated within one or more data structures of the detection module 320 and/or the climate control module 330, and so on.

As a further matter, while the climate control module 330 is discussed as collecting the sensor data 219 in the database(s) 215, in various implementations the sensor data 219 can be used by various vehicle systems 240 of the vehicle 100 for different purposes. For example, the climate control system 242 and/or other components use the sensor data 219 for temperature stabilization within the vehicle interior, humidity stabilization, and so on.

The detection module 320 generally includes computer-executable instructions to determine the type of wearable article from the sensor data 219, specifically, determine the type of wearable article from the identifier. Depending on the identifier, the detection module 320 may obtain the type of wearable article directly from the identifier, utilize the lookup table 340 to cross-reference a serial number included in the identifier, and/or communicate with the remote server 202, as set forth above. Furthermore, the identifier may include supplemental information about the wearable article 130 other than the type of garment. For example, the supplemental information accompanying the identifier may be, for example, the material type, e.g., wool, cotton, etc., insulation type, e.g., down, polyfill, thermal wadding, etc., thermal insulation value, i.e., clothing insulation value expressed in "clo" units where 1 clo ($I_{cl}$)=0.155 K*m²*W$^{-1}$≈0.88 R (where R is the R value in ft²*° F.*hr/Btu), and the like. The $I_{cl}$ (clo) value is the amount of insulation that allows a person at rest to maintain thermal equilibrium in an environment at, for example, 21° C. (70° F.) in a normally ventilated room (0.1 m/s air movement). For example, a single-breasted, thick, lined suit jacket may have an $I_{cl}$ value of 0.44 clo, a long-sleeve dress shirt may have an $I_{cl}$ value of 0.25 clo, and a ski outfit may have an $I_{cl}$ value of 2.0 clo.

The lookup table 340 stored in the database(s) 215, in one embodiment, includes the type of wearable article and may be indexed by digital data such as a serial number included in the identifier. The type of wearable article stored in the lookup table 340 may include the type of garment, and the supplemental information. The lookup table 340 may be updated from the remote server 202 via the communication interface 206. More specifically, the lookup table 340 may be updated after receiving new digital data from the remote server 202 as a result of an update request sent by the detection module 320, and/or the lookup table 340 may be updated by an update request message transmitted from the remote server 202 to the detection module 320. Other suitable methods of updating the lookup table 340 are available.

The identifier may include a digital address, i.e., URL, of a location on the remote server 202, as set forth above, where the type of wearable article can be determined. In one embodiment, the detection module 320, via the communication interface 206, may access the remote server 202 to receive the type of wearable article. In addition to the digital address, the identifier may include a digital key that provides access to the remote server 202, e.g., a website, database, etc.

In either case, in one or more embodiments, the detection module 320 includes instructions to store the type of wearable article in the database(s) 215 for access by at least the climate control module 330. The garment type in addition to the supplemental information that is acquired from the identifier is stored in the database(s) 215 and accessible by the climate control module 330.

The climate control module 330 generally includes computer-executable instructions to control the climate control system 242 based at least in part on the type of wearable article. In one embodiment, the climate control module 330 accesses the database(s) 215 to obtain the type of wearable article, e.g., the type of garment, and calculates a climate offset. The climate offset represents a change in the climate of the vehicle interior 120 from the current climate setting of the climate control system 242. The climate may include, but is not limited to temperature, wind volume, and humidity. The climate offset may be calculated by any suitable means, e.g., an equation relating the type of garment to the climate, a lookup table that includes climate offset values for different types of wearable articles, etc.

As a further matter and as will be discussed in greater detail along with the disclosed method, the climate control module 330, in one embodiment, controls the climate control system 242 by outputting the climate offset to the climate control system 242. Accordingly, the climate control system 242 may adjust the climate of the vehicle interior 120. At any time, the climate control system 242 can override the climate offset, e.g., when the vehicle occupant 160 manually adjusts the temperature.

Additionally, or alternatively, the climate offset value may be enhanced, i.e., made more accurate, by including the supplemental information with the type of wearable article in the climate offset calculation acquired from the identifier. For example, the identifier may include the digital description of the type of garment and the clothing insulation value ($I_{cl}$). The climate offset value may be enhanced by including data from the remote server 202, e.g., weather data, ultraviolet (UV) index data, etc., with the type of wearable article in the climate offset calculation. The climate control module 330 stores the calculated climate offset in the database(s) 215.

Furthermore, the climate offset value may be enhanced by including vehicle data from environmental sensor(s) 222, e.g., interior temperature sensor(s) 223, exterior temperature sensor(s) 224, humidity sensor(s) 225, sunload sensor(s) 226, and/or any sensor in the sensor system 220 with the type of wearable article in the climate offset calculation acquired from the identifier. In one embodiment, the climate control module 330 includes instructions to determine a climate profile based on the climate internal and/or external to the vehicle 100 and controls the climate control system 242 based at least in part on the climate profile and the type of wearable article. In other words, the climate control module 330 calculates the climate offset based on the climate profile and the type of wearable article.

In one embodiment, the climate control module 330 may acquire user preferences 350 from the database(s) 215 and modify the climate offset. In other words, the climate control module 330 includes instructions to control the climate control system 242 based on user preferences 350 associated with the type of wearable article. For example, the vehicle occupant 160 may want to assign a different climate offset when wearing a specific type of wearable article affixed with the tag 140. As an example, the vehicle occupant 160 may want to modify the climate offset when the type of wearable article is determined to be. e.g., a dress coat, and only when the outside temperature is, e.g., below freezing. The climate control module 330, in one embodiment, includes instructions to recognize, i.e., learn, when the type of wearable article is similar to the type of wearable article that has an associated user preference 350 assigned to it. When a similar match occurs, the climate control module 330 modifies the climate offset accordingly. The user preferences 350, in one embodiment may be specific to vehicle occupants 160, e.g., as determined from a facial recognition system of the vehicle 100 (not shown), and/or zones within the vehicle, 100 e.g., driver's seat region, rear left passenger seat region, etc., that are occupied. The user preferences 350 may be inputted and stored in the database(s) 215 via an input system 230 (FIG. 2) associated with the climate control system 242, e.g., via a climate control head, universal serial port (USB) port, etc. The user preferences 350 may be displayed by an output system 235 (FIG. 2) associated with the climate control system 242.

Alternatively, the user preference 350 may be large enough such that the modification to the climate offset would require additional control of the climate of the vehicle interior 120. In one embodiment, the climate control module 330 includes instructions to output a control signal to one of the vehicle systems 240. For example, the climate control module 330 may output the control signal to a body control module (BCM) of a body control system 244 to lower one or more windows.

Figure 4:
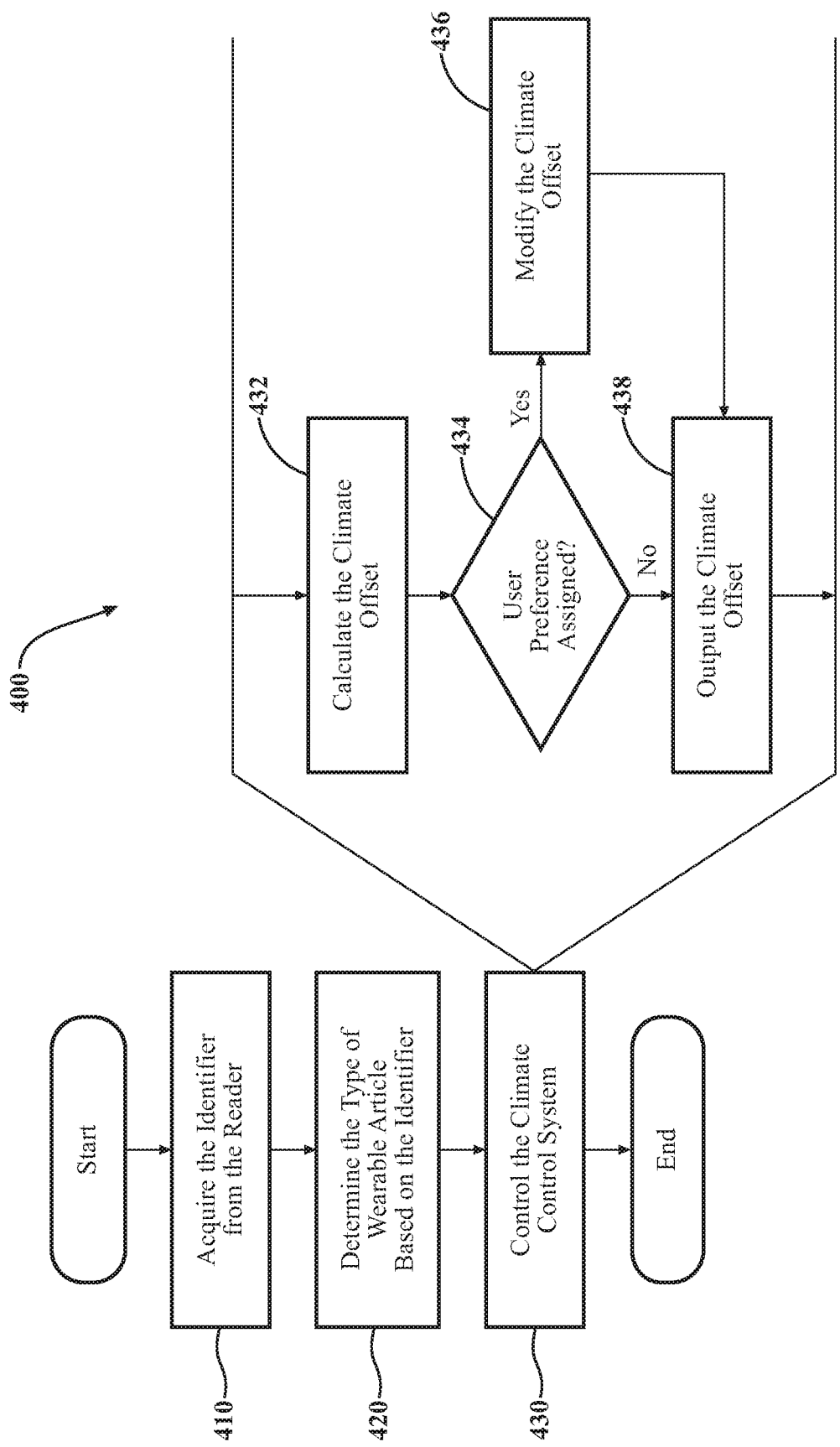
FIG. 4 is one example of a method that is associated with using an identifier to determine the type of the wearable article and controlling a climate control system.

FIG. 4 illustrates a flowchart of a method 400 that is associated with adjusting a climate of the vehicle interior depending on the type of wearable article that is being worn. Method 400 will be discussed from the perspective of the climate system 110 of FIGS. 1-3. While method 400 is discussed in combination with the climate system 110, it should be understood that the method 400 is not limited to being implemented within the climate system 110, but is instead one example of a system that may implement the method 400.

At a block 410, the reader 150 acquires the identifier by transmitting a signal to the tag 140 affixed to the wearable article 130 and receiving a signal from the tag 140, namely the identifier, if the tag 140 is in proximity of the reader 150. The reader 150 may store the identifier in the memory of the reader 150 and/or broadcast the identifier via a wired and/or wireless technique, as set forth above, to the processor(s) 210. The detection module 320 acquires the identifier from the reader 150 and stores the identifier in the database(s) 215. The method 400 then proceeds to a block 420.

At the block 420, the detection module 320 determines the type of the wearable article 130. As set forth above, depending on the identifier, the detection module 320 may obtain the type of the wearable article 130 directly from the identifier, utilize the lookup table 340 to cross-reference a serial number included in the identifier, and/or communicate with the remote server 202 from a digital address supplied by the identifier. The information obtained from the identifier may include the type of garment and the supplemental information, i.e., material type, insulation type, clothing insulation value ($I_{cl}$), and the like. The information obtained from the identifier is made accessible to the climate control module 330, e.g., the detection module 320 stores the information obtained from the identifier in the database(s) 215. The method 400 then proceeds to a block 430.

At the block 430, the climate control module 330 outputs a control signal, e.g., a climate offset, to the climate control system 242. As described in the sub-process of blocks 432, 434, 436 and 438, the climate control module 330 calculates, for example, the climate offset and determines if the climate offset needs to be modified due to an assigned user preference 350 before outputting the climate offset to the climate control system 242. The method 400 then proceeds to the block 432.

More specifically, at the block 432, the climate control module 330 acquires information about the type of the wearable article 130 from the database(s) 215. The climate control module 330 calculates, as described above, the climate offset, which represents a change in the current climate control system setting that is based at least in part on the type of the wearable article 130 information obtained by the detection module 320 from the identifier. The database(s) 215 may contain the supplemental information about the wearable article 130. The method 400 then proceeds to the block 434.

At the block 434, the climate control module 330 determines if user preferences 350 are associated with the type of the wearable article 130. The climate control module 330 references the user preferences 350 from the database(s) 215 and determines if any of the user preferences 350 are assigned to the type of the wearable article 130 obtained from the identifier. If the climate control module 330 determines that there are one or more user preferences 350 assigned to the type of the wearable article 130, the method 400 proceeds to the block 436. Otherwise, the method 400 proceeds to the block 438.

At the block 436, the climate control module 330 modifies the climate offset from the calculated value in the block 432. The climate offset modification is determined from the type of user preference 350. For example, various types of user preferences 350 modifying the climate offset may include, but are not limited to weather conditions when wearing a specific type of the wearable article 130, wearing a specific type of the wearable article 130 in combination with other wearable articles, etc. The modification to the climate offset may be specified by, e.g., a percent deviation from the calculated climate offset, a specific temperature deviation, etc. The method 400 then proceeds to the block 438.

At the block 438, the climate control module 330 outputs the climate offset to the climate control system 242. The climate offset output to the climate control system 242 is a request to the climate control system 242 to adjust the climate of the vehicle interior 120. The climate offset requested may be specified by, e.g., a percent or specific deviation from the temperature currently set by the climate control system 242, a percent or specific deviation from the humidity currently set by the climate control system 242, a change in the airflow volume, i.e., a change in fan speed, to a portion or to the entire vehicle interior, a change from/to the vehicle interior receiving airflow from outside of the vehicle to/from recirculating the airflow within the vehicle interior only, adjusting the sunload of the vehicle interior by adjusting the window tinting (if the vehicle is so equipped with such a system), and/or any other suitable method for offsetting the climate of the vehicle interior 120 currently set by the climate control system 242. At any time, the climate control system 242 can override the climate offset, e.g., when the vehicle occupant 160 manually adjusts the temperature. At this point, the method 400 then terminates.

Figure 5:
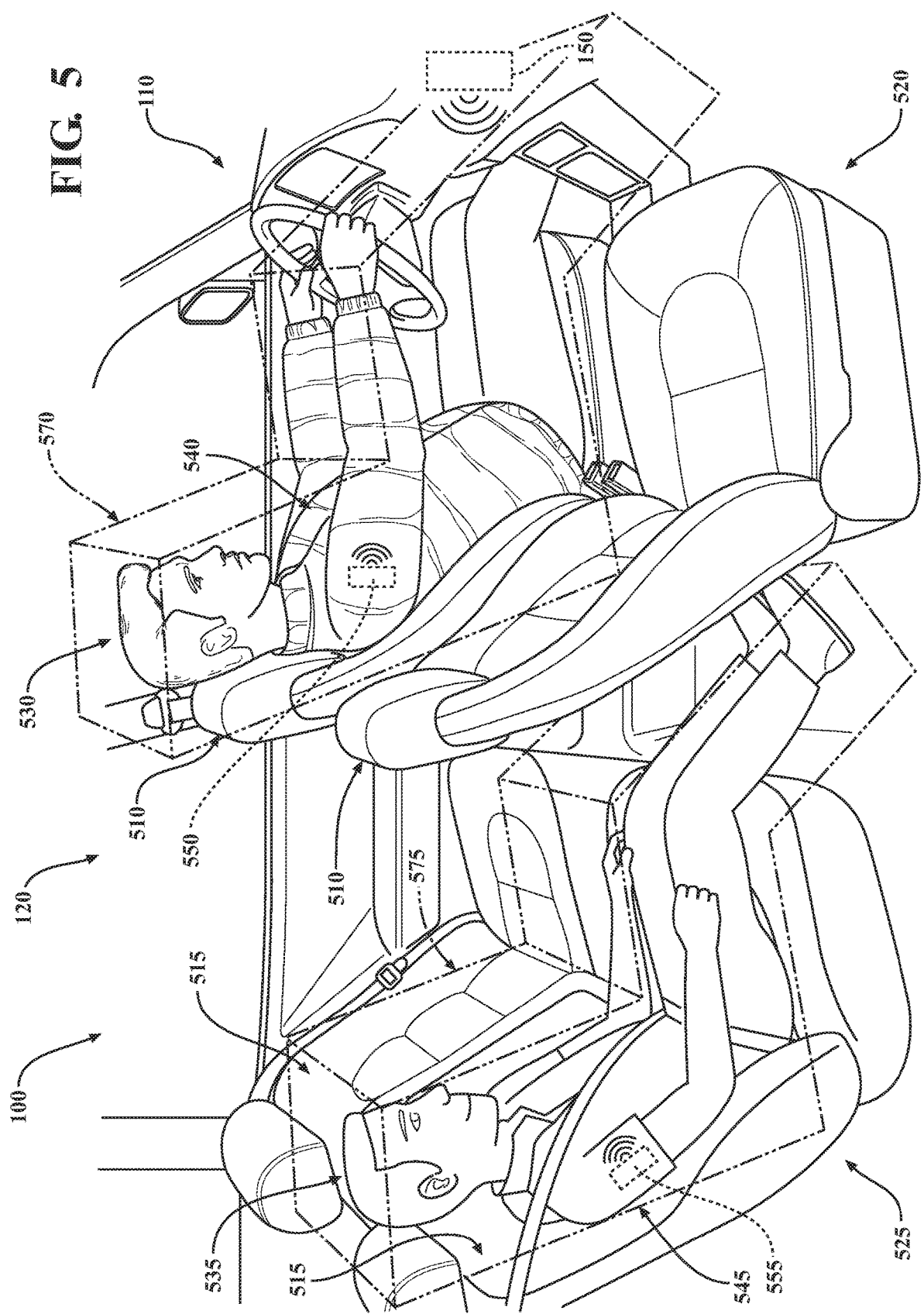
FIG. 5 is a perspective view of an example climate system recognizing a location of the wearable article.

As a further example of how the climate system 110 operates, FIGS. 5-7 will now be discussed. FIG. 5 illustrates an example of the climate system 110 recognizing a location of a wearable article 540 worn by a front occupant 530 and a wearable article 545 worn by a rear occupant 535 so that, for example, the climate in the vehicle interior 120 can be adjusted accordingly. The vehicle 100 may include a front seat 510 and a rear seat 515 located in the vehicle interior 120. As shown in FIG. 5 for example, the vehicle 100 includes two adjacent front seats 510 arranged in a front row 520 and two adjacent rear seats 515 arranged in a rear row 525. The vehicle 100 may include any suitable number of front seats 510 and rear seats 515 arranged in any suitable number of rows. As shown in FIG. 5, the vehicle 100 includes, for example, the front occupant 530 wearing the wearable article 540, e.g., a winter coat, affixed with a front tag 550 in one of the front seats 510 and the rear occupant 535 wearing the wearable article 545, e.g., a short sleeve shirt, affixed with a rear tag 555.

With continued reference to FIG. 5, the climate system 110 includes the reader 150. In one embodiment, the reader 150 is configured to provide distance data, i.e., the distance between the reader 150 and the front and rear tags 550, 555, which is used by the climate control module 330 to determine locations of the front and rear tags 550, 555 within the vehicle interior 120. For example, the distance data generated by the reader 150 may be the power present in the received signal from the front and rear tags 550, 555, i.e., a received signal strength indicator (RSSI). Any suitable technique may be used by the reader 150 to determine the distance between the reader 150 and the front and rear tags 550, 555. With reference to FIG. 5, the detection module 320 or climate control module 330 may acquire the distance data from the reader 150 of the front and rear tags 550, 555 and store the distance data in the database(s) 215. Accordingly, the climate control module 330 would collect the distance data from the database(s) 215 and determine the locations of the front and rear tags 550, 555 of the respective wearable articles 540, 545 within the vehicle interior 120, i.e., the specific front and rear seat 510, 515 locations. In other words, the climate control module 330 includes instructions to determine the locations of the wearable articles 540, 545 within the vehicle interior 120.

Furthermore, the vehicle interior 120 may include a front zone 570 and a rear zone 575. As shown in FIG. 5 for example, the vehicle 100 includes the front zone 570 arranged in the front row 520 and the rear zone 575 arranged in the rear row 525. The vehicle 100 may include any suitable number of the front zones 570 and the rear zones 575 arranged in any suitable number of rows. The front zone 570 includes the wearable article 540 affixed with the front tag 550 and is defined to be a volume surrounding both the front occupant 530 and the wearable article 540 worn by the front occupant 530. The rear zone 575 includes the wearable article 545 affixed with the rear tag 555 and is defined to be a volume surrounding both the rear occupant 535 and the wearable article 545 worn by the rear occupant 535. In one embodiment, the climate control module 330 includes instructions to control, e.g., the climate within one or more zones of the vehicle interior 120. For example, as shown in FIG. 5, the climate control module 330 may control the climate within the front and rear zones 570, 575 that include the respective wearable articles 540, 545. Accordingly, with continued reference to FIG. 5, the detection module 320 may acquire the identifiers for the front and rear tags 550, 555 from the reader 150 and determine the types of wearable articles 540, 545. The climate control module 330 may determine the locations of the wearable articles 540, 545, as described above, and calculate the climate offsets associated with wearable articles 540, 545. The climate control module 330 may then output the climate offsets and associated locations of the wearable articles 540, 545 to the climate control system 242. The climate control system 242 may adjust climates in the front zone 570 and the rear zone 575 according to the respective climate offsets and locations. The climate offsets may be different from each other, and the vehicle 100 may include any suitable number of the front and rear zones 570, 575 including front and rear occupants 530, 535 wearing respective wearable articles 540, 545 affixed with respective front and rear tags 550, 555.

Figure 6:
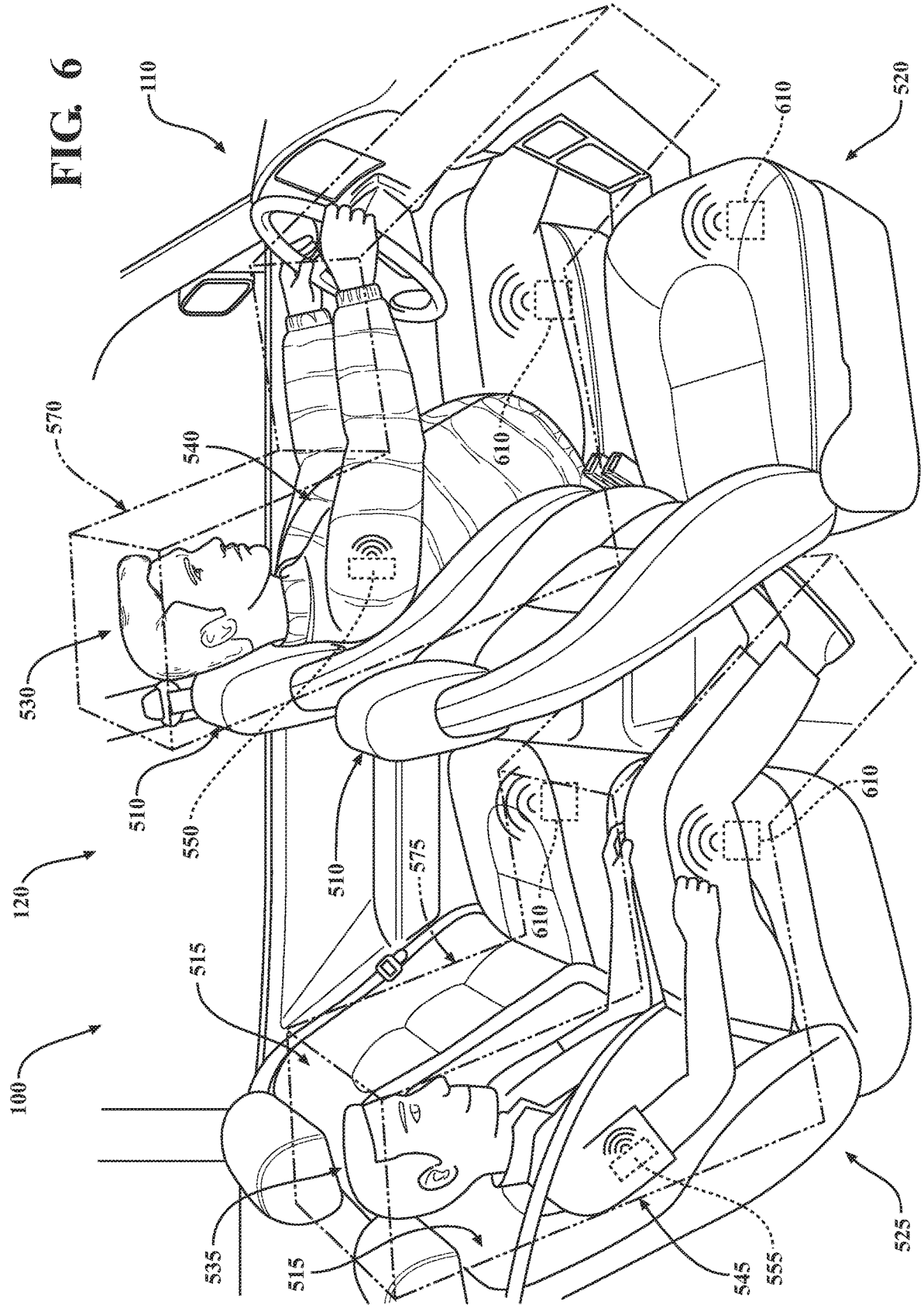
FIG. 6 is a perspective view of another example climate system recognizing a location of the wearable article.

As a further example of how the climate system 110 operates, FIG. 6 illustrates another example of the climate system 110 of FIG. 5. The example illustrated in the FIG. 6 may be applicable for the antennas of the tags 140 that are configured for near field communication (NFC). NFC communications typically have a limited range, e.g., less than one meter, and localized antennas utilized by the reader 150 may be needed to communicate with the tags 140. As shown in FIG. 6, the reader 150 (not shown) includes a plurality of antennas 610, each of which are located in proximity to the front and rear seats 510, 515. The antennas 610 are communicably coupled to the reader 150. Each antenna 610 is capable of transmitting a signal and receiving a signal, i.e. the identifier, from the front and rear tags 550, 555 affixed to the respective wearable articles 540, 545. The antennas 610 of the reader 150 are also configured to communicate location data to the reader 150, e.g., a unique location identification number that represents the specific front or rear seat 510, 515 location where the antenna 610 is installed. The identifiers and the location data are stored in the database(s) 215. In a similar manner as described for the climate system 110 in FIG. 5, the climate control module 330 determines the locations of the wearable articles 540, 545 from the location data and outputs the respective climate offsets and locations of the wearable article 540, 545 to the climate control system 242 to control the respective front and rear zones 570, 575.

Figure 7:
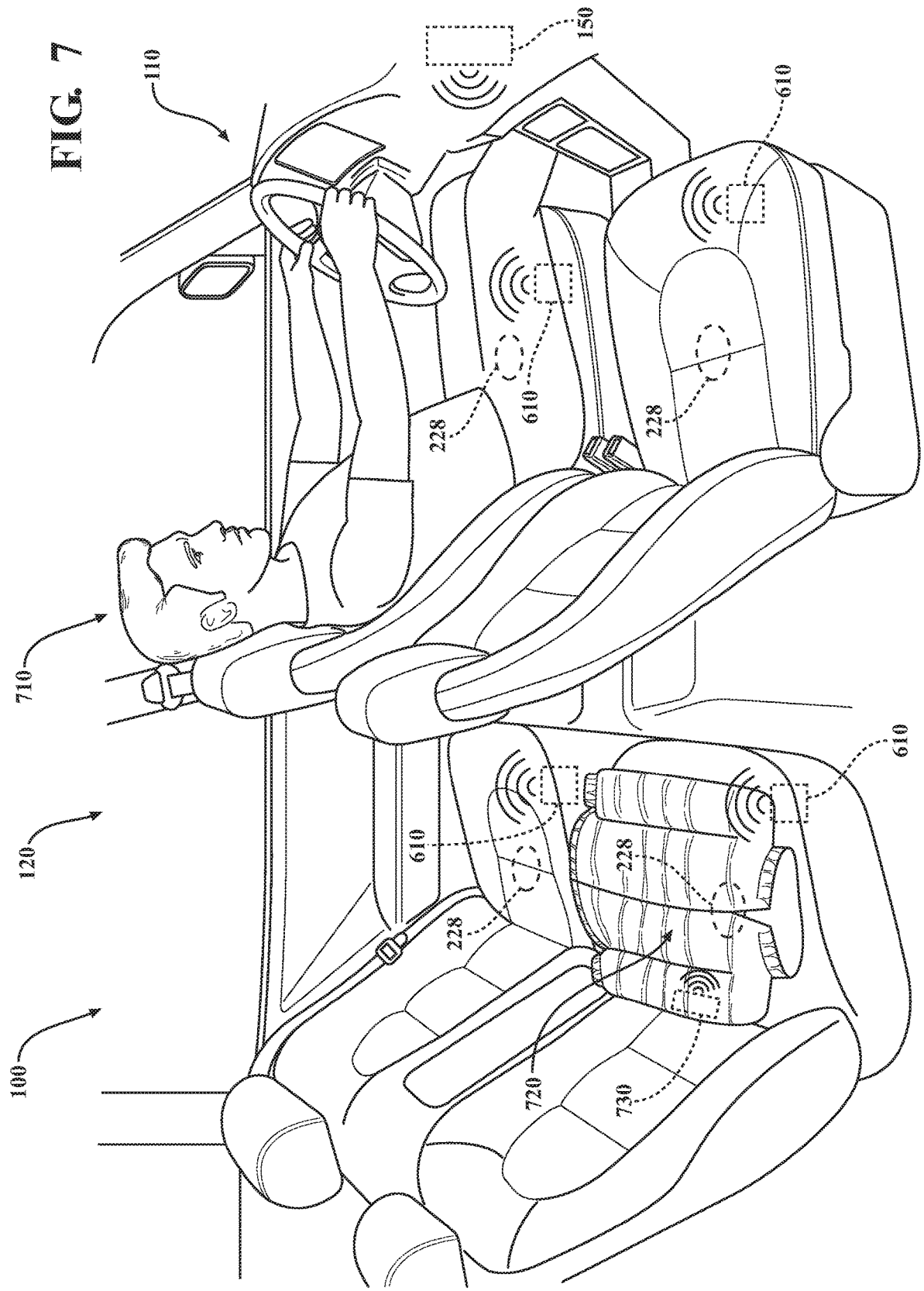
FIG. 7 is a perspective view of an example climate system for determining that the wearable article is not being worn by a vehicle occupant.

As yet a further example of how the climate system 110 operates, FIG. 7 illustrates an example of the climate system 110 where a vehicle occupant 710 is separated from a wearable article 720 and not needing climate adjustment capabilities. Referring to FIG. 7, the vehicle 100 includes the vehicle occupant 710, the wearable article 720 affixed with a tag 730, and occupant presence sensor(s) 228 (FIG. 2). The occupant presence sensor(s) 228 are, e.g., pressure sensors, mounted on the front and rear seats 510, 515 that become active when the vehicle occupant 710 sits in the front or rear seats 510, 515. The data from the occupant presence sensor(s) 228 belonging to the sensor system 220 is stored in the database(s) 215 and accessible by the climate control module 330. Using any of the above wearable article location techniques illustrated in FIGS. 5-6, the climate control module 330 may determine that the vehicle occupant 710 is not wearing the wearable article 720 by comparing a location of the wearable article 720 and the seat location of the vehicle occupant 710 as determined from the active occupant presence sensor 228. That is, if the location of the wearable article 720 does not match the front or rear seat 510, 515 associated with the active occupant presence sensor 228, this condition would indicate that the vehicle occupant 710 may be separated from the wearable article 720. In other words, in one embodiment, the climate control module 330 includes instructions that controls the climate control system 242 only when the location of the wearable article 720 is within a predetermined distance, e.g. 50 cm, from the vehicle occupant 710, e.g., when the wearable article 720 is located in the same seat location as the vehicle occupant 710.

FIG. 2 will now be discussed in full detail as an example environment within which the system and methods disclosed herein may operate. The vehicle 100 can include one or more processors 210. In one or more arrangements, the processor(s) 210 can be a main processor of the vehicle 100. For instance, the processor(s) 210 can be an electronic control unit (ECU). The vehicle 100 can include one or more databases 215 for storing one or more types of data. The database(s) 215 can include volatile and/or non-volatile memory. Examples of suitable database(s) 215 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The database(s) 215 can be a component of the processor(s) 210, or the database(s) 215 can be operatively connected to the processor(s) 210 for use thereby. The term "operatively connected," as used throughout this description, can include direct or indirect connections, including connections without direct physical contact.

The one or more databases 215 can include the sensor data 219. In this context, "sensor data" means any information about the sensors that the vehicle 100 is equipped with, including the capabilities and other information about such sensors. As will be explained below, the vehicle 100 can include the sensor system 220. The sensor data 219 can relate to one or more sensors of the sensor system 220. As an example, in one or more arrangements, the sensor data 219 can include information on one or more interior temperature sensors 223 of the sensor system 220.

In some instances, at least a portion of the sensor data 219 can be located in one or more databases 215 located onboard the vehicle 100. Alternatively, or in addition, at least a portion of the sensor data 219 can be located in one or more databases 215 that are located remotely from the vehicle 100.

As noted above, the vehicle 100 can include the sensor system 220. The sensor system 220 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor(s) 210 to keep up with some external process.

In arrangements in which the sensor system 220 includes a plurality of sensors, the sensors can work independently from each other. Alternatively, two or more of the sensors can work in combination with each other. In such case, the two or more sensors can form a sensor network. The sensor system 220 and/or the one or more sensors can be operatively connected to the processor(s) 210, the database(s) 215, and/or another element of the vehicle 100 (including any of the elements shown in FIG. 2). The sensor system 220 can acquire data of at least a portion of the external environment of the vehicle 100 (e.g., nearby vehicles).

The sensor system 220 can include any suitable type of sensor. Various examples of different types of sensors will be described herein. However, it will be understood that the embodiments are not limited to the particular sensors described. The sensor system 220 can include one or more vehicle sensors 221. The vehicle sensor(s) 221 can detect, determine, and/or sense information about the vehicle 100 itself. In one or more arrangements, the vehicle sensor(s) 221 can be configured to detect, and/or sense position and orientation changes of the vehicle 100, such as, for example, based on inertial acceleration. In one or more arrangements, the vehicle sensor(s) 221 can include one or more accelerometers, one or more gyroscopes, an inertial measurement unit (IMU), a dead-reckoning system, a global navigation satellite system (GNSS), a global positioning system (GPS), a navigation system, and/or other suitable sensors. The vehicle sensor(s) 221 can be configured to detect, and/or sense one or more characteristics of the vehicle 100. In one or more arrangements, the vehicle sensor(s) 221 can include a speedometer to determine a current speed of the vehicle 100.

Alternatively, or in addition, the sensor system 220 can include one or more environmental sensors 222 configured to acquire, and/or sense the environment data interior and exterior to the vehicle 100. For example, the one or more environmental sensors 222 can be configured to detect the temperature of the passenger compartment of the vehicle 100 from one or more interior temperature sensors 223, external temperature surrounding the outside of the vehicle 100 from one or more exterior temperature sensors 224, the humidity from the interior and/or the exterior of the vehicle 100 from one or more humidity sensors 225, and the sunload present in the passenger compartment of the vehicle 100 from one or more sunload sensors 226.

Various examples of sensors of the sensor system 220 will be described herein. The example sensors may be part of the one or more environmental sensors 222 and/or the one or more vehicle sensors 221. However, it will be understood that the embodiments are not limited to the particular sensors described.

As an example, in one or more arrangements, the sensor system 220 can include one or more cameras 227. In one or more arrangements, the one or more cameras 227 can be high dynamic range (HDR) cameras or infrared (IR) cameras.

The vehicle 100 can include an input system 230. An "input system" includes any device, component, system, element or arrangement or groups thereof that enable information/data to be entered into a machine. The input system 230 can receive an input from a vehicle passenger (e.g. a operator or a passenger). The vehicle 100 can include an output system 235. An "output system" includes any device, component, or arrangement or groups thereof that enable information/data to be presented to a vehicle passenger (e.g. a person, a vehicle passenger, etc.).

The vehicle 100 can include one or more vehicle systems 240. Various examples of the one or more vehicle systems 240 are shown in FIG. 2. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include the climate control system 242, i.e. the HVAC system, and the body control system 244. Each of these systems can include one or more devices, components, and/or combination thereof, now known or later developed. For example, the climate control system 242 includes the heating system, ventilation system, air conditioning system, various actuators, motors and air dampers, fan motors, control head utilized as an input system 230 and/or an output system 235, condensers, evaporators, heating elements, etc.

The processor(s) 210 and/or the climate system 110 can be operatively connected to communicate with the various vehicle systems 240 and/or individual components thereof. For example, returning to FIG. 2, the processor(s) 210 can be in communication to send and/or receive information from the various vehicle systems 240 to control the movement, speed, maneuvering, heading, direction, etc. of the vehicle 100. The processor(s) 210 and the climate system 110 may control some or all of these vehicle systems 240.

As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 250. The actuators 250 can be any element or combination of elements operable to modify, adjust and/or alter one or more of the vehicle systems 240 or components thereof responsive to receiving signals or other inputs from the processor(s) 210. Any suitable actuator can be used. For instance, the one or more actuators 250 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor, implement one or more of the various processes described herein. One or more of the modules can be a component of the processor(s) 210, or one or more of the modules can be executed on and/or distributed among other processing systems to which the processor(s) 210 is operatively connected. The modules can include instructions (e.g., program logic) executable by one or more processor(s) 210. Alternatively, or in addition, one or more databases 215 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A climate system comprising:
   a reader;
   one or more processors, the one or more processors in communication with the reader;
   a memory communicably coupled to the one or more processors and storing:
   a detection module including instructions that when executed by the one or more processors cause the one or more processors to, in response to acquiring an identifier from the reader, determine a type of a wearable article based on the identifier, the identifier being associated with a tag affixed to the wearable article in proximity of the reader; and
   a climate control module including instructions that when executed by the one or more processors cause the one or more processors to determine a location of the wearable article within a vehicle interior and control a climate control system based at least in part on the type of the wearable article only when the location of the wearable article is within a predetermined distance from a vehicle occupant.

2. The climate system of claim 1, wherein the climate control module further includes instructions to:
   determine a climate profile based on a climate interior and exterior to a vehicle; and
   control the climate control system based at least in part on the climate profile.

3. The climate system of claim 1, wherein the climate control module further includes instructions to control a climate within a zone of a vehicle interior that includes the wearable article.

4. The climate system of claim 1, wherein the climate control module further includes instructions to control the climate control system based on a user preference associated with the type of the wearable article.

5. The climate system of claim 1, wherein the tag includes an antenna configured for radio frequency (RF) communication with the reader when the tag is in proximity of the reader and the antenna is a dedicated near field communication (NFC) antenna configured for NFC protocol communication.

6. The climate system of claim 1, wherein the tag includes an antenna configured for radio frequency (RF) communication with the reader when the tag is in proximity of the reader and the antenna is a dedicated radio-frequency identification (RFID) antenna configured for RFID protocol communication.

7. A non-transitory computer-readable medium and storing instructions that when executed by one or more processors cause the one or more processor to:
   in response to acquiring an identifier from a reader, determine a type of a wearable article based on the identifier, the identifier being associated with a tag affixed to the wearable article in proximity of the reader;
   determine a location of the wearable article within a vehicle interior; and
   control a climate control system based at least in part on the type of the wearable article only when the location of the wearable article is within a predetermined distance from a vehicle occupant.

8. The non-transitory computer-readable medium of claim 7, wherein the computer-readable medium further includes instructions that when executed by the one or more processors cause the one or more processors to:
   determine a climate profile based on a climate interior and exterior to a vehicle; and
   control the climate control system based at least in part on the climate profile.

9. The non-transitory computer-readable medium of claim 7, wherein the computer-readable medium further includes instructions that when executed by the one or more processors cause the one or more processors to:
   control a climate within a zone of a vehicle interior that includes the wearable article.

10. The non-transitory computer-readable medium of claim 7, wherein the computer-readable medium further includes instructions that when executed by the one or more processors cause the one or more processors to:
    control the climate control system based on a user preference associated with the type of the wearable article.

11. A method comprising:
    in response to acquiring an identifier from a reader, determining a type of a wearable article based on the identifier, the identifier being associated with a tag affixed to the wearable article in proximity of the reader;

determining a location of the wearable article within a vehicle interior; and controlling a climate control system based at least in part on the type of the wearable article only when the location of the wearable article is within a predetermined distance from a vehicle occupant.

12. The method of claim 11, further comprising:

determining a climate profile based on a climate interior and exterior to a vehicle; and controlling the climate control system based at least in part on the climate profile.

13. The method of claim 11, further comprising:

controlling a climate within a zone of a vehicle interior that includes the wearable article.

14. The method of claim 11, further comprising:

controlling the climate control system based on a user preference associated with the type of the wearable article.

\* \* \* \* \*